Patented Aug. 17, 1943

2,326,810

UNITED STATES PATENT OFFICE 2,326,810

COMPOSITION OF MATTER

David R. Wiggam, West Grove, Pa., assignor to Hercules Powder Company, Wilmington, Del., a corporation of Delaware No Drawing. Application May 31, 1939, Serial No. 276,682

11 Claims. (Cl. 106—173)

This invention relates to a plastic composition suitable for molding and more particularly it relates to a cellulose ether composition suitable for molding.

Ethyl cellulose is a cellulose derivative of relatively low melting point and thus has been considered promising for molding compositions. However, ethyl cellulose alone is not molded successfully at temperatures below its decomposition point as good flow and homogeneity of the molding are not obtained. When ethyl cellulose is modified by plasticizers in the well known manner of the cellulose acetate injection molding art, the compositions improve in flow characteristics. However, such compositions are too soft. They also warp at ordinary temperatures because of excessive cold flow. Modification by means of resins has also been considered but no resin imparting improved molding characteristics has been known which is light in color, stable under the conditions of preparing the molding composition, and non-discoloring and non-embrittling upon aging.

It is an object of this invention to provide a tough molding composition which is readily prepared, has good molding characteristics and at the same time has little or no tendency to cold flow. It is a further object to provide a molding composition which has very little color, is stable under the conditions of preparation and molding, and which is stable, non-embrittling and non-discoloring with age.

Now in accordance with this invention these objects are attained by a composition comprising ethyl cellulose of the type which is soluble in the usual organic solvents and hydrogenated rosin. In this composition the ethyl cellulose is in greater proportion than the hydrogenated rosin. Fillers, coloring matter, lubricants, and other modifiers may be added if desired.

The ethyl cellulose which is utilized in the compositions of this invention is of the type which is soluble in some or all of the usual organic solvents such as benzol, toluol, xylol, benzol-methanol mixtures, toluol-ethanol mixtures, xylol-butanol mixtures, ethyl acetate, methyl ethyl ketone, acetone, etc. The ethyl cellulose will have an ethoxyl content in the range from about 41% to about 51% and preferably in the range from about 44% to about 49%. The viscosity characteristic of the ethyl cellulose may vary widely. In general, the viscosity characteristic may be in the range from about 2 seconds to the highest viscosity practically prepared, the viscosity characteristic being measured by the time required for ten inches of fall of a ⅝" steel ball thru a solution of the ethyl cellulose at 25° C. in a tube 25 mm. in diameter, the solution consisting of 20% of ethyl cellulose and 80% of a solvent consisting of 80 parts of toluene to 20 parts of ethyl alcohol. The lower viscosity material is colloided more rapidly and flows a little more readily in molding whereas the higher viscosity material gives tougher plastics. However, preferably ethyl cellulose having a viscosity characteristic in the range from about 50 to about 500 seconds is utilized as it gives plastics which flow well in molding and are very tough.

The hydrogenated rosin which is utilized in the compositions of this invention is the product which is obtained by hydrogenating rosin as such, which consists chiefly of abietic, pimaric, sapinic or the like rosin acids or mixtures thereof, under conditions suitable to achieve saturation of at least 50% of the available two double bonds of the rosin acid radicals present. The term "hydrogenated rosin" as used herein and in the claims, includes similarly hydrogenated products obtained from any of the said group of rosin acids in substantially pure form. The hydrogenated rosin may be prepared, for example, by contacting fluid refined rosin with hydrogen in the presence of an activated nickel catalyst at a pressure of from about 2000 to 5000 pounds per square inch at a temperature of from about 125° C. to about 226° C. for 1 to 2 hours or other known suitable methods may be employed. Preferably the rosin will have been refined in the usual manner to a clear product of low color, say to a color of N or better, and will have been subjected to treatment at reduced pressure to remove slightly volatile constituents. The rosin may also be reduced in color, before or after hydrogenation by heat treatment, for example, by heating in an inert atmosphere for 0.2 to 3 hours at 275°–325° C. The hydrogenated rosin may also be refined to reduce color after hydrogenation by the known methods. For clear and light colored compositions, hydrogenated rosin with the least possible color is preferable.

The compositions of this invention will comprise the hereinbefore described ethyl cellulose and hydrogenated rosin in such proportion that more ethyl cellulose will be present than hydrogenated rosin. In general the compositions will comprise 10 parts of ethyl cellulose and from 1 to 10 parts of hydrogenated rosin. For molding powders, especially those intended for injection molding, the composition preferably will comprise 10 parts of ethyl cellulose and from 1.0 to 3.5 parts of hydrogenated rosin. This proportion combines optimum molding characteristics with optimum properties for the finished moldings. All proportions mentioned herein and in the appended claims are in parts by weight.

The binary mixture of ethyl cellulose and hydrogenated rosin hereinabove described is suitable for injection and compression molding. However, usually dyes or other coloring matter will be incorporated to obtain the particular color and appearance desired. Inert solid fillers may also be incorporated to cheapen, to harden, and to change the appearance of the plastic, if desired. Suitable fillers are, for example, whiting, china clay, powdered silica, barium sulphate, calcium sulphate, titanium dioxide, iron oxides, chromium oxide, chrome green, chrome yellow, Prussian blue, carbon black, and so forth. The term "filler" as used herein and in the claims will include pigments. It will be appreciated that too much filler or pigment will detract from the toughness of the plastic.

Preferably molding lubricants, for example, stearic acid; butyl stearate; certain water insoluble soaps like magnesium stearate, aluminum stearate, etc.; natural waxes such as montan, japan, candelilla, carnauba, ceresin, etc.; paraffin, petroleum jelly, etc. will also be incorporated in the plastic in relatively small proportions. Such lubricants speed up molding, have a beneficial effect upon the appearance of the surface of the plastic, and decrease moisture absorption. However, they should not be used in quantity sufficient to give a greasy or waxy feel to the plastic. For example, a quantity from about 0.1% to 5% of the plastic is preferably used; in general less than about 3% is incorporated.

A limited quantity of solvent plasticizer may also be added to the composition of this invention, if desired. Small quantities of such plasticizers, say about 3% to about 5% of the composition but rarely more than 10% of the composition, are sometimes advantageous as they improve toughness slightly, improve flow characteristics, and act as a blending agent to facilitate the preparation of the plastic. They are especially advantageous when a relatively low proportion of hydrogenated rosin is used in the composition. However, the use of more than the small quantity mentioned is, in general, undesirable since such use causes cold flow and tends to make the composition sticky. Suitable solvent plasticizers are, for example, dibutyl phthalate, diamyl phthalate, tricresyl phosphate, triphenyl phosphate, tributyl phosphate, chlorinated diphenyl, chlorinated naphthalene derivatives, castor oil, triacetin, alkyl phthalyl alkyl glycollates such as methyl phthalyl ethyl glycollate, and the like. Non-solvent plasticizers may be used in a somewhat larger proportion since they do not cause the plastic to become sticky or to cold flow. Mineral oil especially is referred to as a non-solvent plasticizer. It may be used in quantities up to about 25% of the ethyl cellulose in the composition but preferably no more than about 15% of the ethyl cellulose will be used. It serves in part as a lubricant, it imparts resistance to water absorption, and it is of particular value because of its very low cost.

The compositions of this invention may be advantageously prepared entirely without the use of volatile solvents. For example, the ingredients of the composition may be mixed in lump or powder form and colloided in a suitably heated Banbury mill. The ingredients are charged into the heated mill and colloided in the usual manner, except, it is to be noted, no volatile solvents are used. The colloided mass is removed from the Banbury mill and rolled into a sheet while still hot. The sheet is broken up and reduced to the usual form of coarsely granulated or more or less pulverulent molding powders by means of a rotating knife mill, hammer mill, or other suitable reducing means.

Alternatively, the ingredients of the composition may be colloided by rolling on a suitably heated two roll mill of the type well known in the plastic art. The ingredients are mixed and colloided on the rolls without use of volatile solvents, and the colloided plastic is then stripped from the mill and reduced to molding powder in the usual manner. It will be appreciated that the celluoid process, in which the ingredients are made into a paste with a volatile solvent followed by removal of the solvent by hot rolling, may be utilized. However, the use of volatile solvents is dangerous. Furthermore, small quantities of solvent tend to be retained in the plastic and cause warping of molded objects prepared therefrom by their evaporation.

The temperatures used in molding the compositions of this invention will vary with the actual composition employed. However, the proper molding temperature is readily found by experiment merely by increasing temperature until a homogeneous tough molding is obtained. The compositions are quite stable at this temperature, so that flashing, scrap composition, rejected moldings, etc. may be reground for reuse.

The table following gives examples of specific compositions in accordance with this invention:

|  | I | II | III | IV | V | VI | VII | VIII | IX | X | XI | XII |
|---|---|---|---|---|---|---|---|---|---|---|---|---|
| Ethyl cellulose 47.8% ethoxyl, 1,100 seconds viscosity | 60 | 60 | 60 | 60 | 60 |  |  |  |  |  |  |  |
| Ethyl cellulose 46.5% ethoxyl, 600 seconds viscosity |  |  |  |  |  | 60 |  |  |  |  |  |  |
| Ethyl cellulose 44.7% ethoxyl, 80 seconds viscosity |  |  |  |  |  |  | 60 | 60 |  |  |  |  |
| Ethyl cellulose 47.9% ethoxyl, 60 seconds viscosity |  |  |  |  |  |  |  |  | 80 | 75 | 68.9 | 65 |
| Hydrogenated rosin | 40 | 35 | 35 | 40 | 30 | 35 | 38 | 35 | 20 | 15 | 11.5 | 27.5 |
| Triphenyl phosphate |  | 5 | 5 |  |  | 5 | 2 | 5 |  |  |  |  |
| Dibutyl phthalate |  |  |  |  | 10 |  |  |  |  |  |  |  |
| Zinc stearate | 3 |  |  |  | 3 |  |  |  |  |  |  |  |
| Magnesium stearate |  |  | 3 |  |  | 3 | 3 |  |  | 10 | 6 | 7.5 |
| Mineral oil (Nujol) |  |  |  |  |  | 1 |  |  |  |  |  |  |
| Paraffin wax |  | 1 |  |  |  |  | 1 |  |  | 2 | 1.8 | 2 |
| Japan wax |  |  |  |  |  |  | 2 |  |  |  |  |  |
| Titanium dioxide | 2 | 2 | 2 |  | 2 | 2 |  | 2 |  |  |  |  |
| Lithopone |  |  |  |  |  |  |  |  |  |  | 12 |  |

The compositions of this invention are particularly useful in molding compositions. They may be prepared in the form of molding powder as hereinabove described to be used for pressure molding or in injection molding. They are especially advantageous in injection molding since complicated and intricate shapes are readily molded therefrom because of their good flow characteristics and since inserts may safely be incorporated in the molding as the compositions do not warp. Extruded shapes such as rods, tubes, etc. are readily made. The compositions are suitable for extrusion around wire or cable in the usual manner. Preferably, for such use, a composition relatively high in ethyl cellulose and containing mineral oil is utilized. The compositions of this invention are also suitable for coating purposes as they may be prepared in the form, for example, of clear or pigmented lacquers for spraying, brushing, or dipping, made merely by dissolving the components of the composition in the usual solvents.

The compositions of this invention have the advantage of providing good flow in molding and form homogeneously tough moldings. At the same time practically no cold flow difficulties are encountered. The compositions are very low in color and they are stable chemically, and stable in color, under the conditions of preparation and molding. Furthermore they do not discolor, embrittle, or change chemically with time. They are easily and safely prepared as it is unnecessary to use solvents during the colloiding operation. Since the usual plasticizers may be eliminated or are used only in relatively very small quantities, moldings prepared from the compositions of this invention do not warp because of the inevitable slow loss of plasticizer due to volatility; nor do they suffer from surface dulling caused by plasticizer losses.

It will be understood that the details and examples hereinbefore set forth are illustrative only, and that the invention as broadly described and claimed is no way limited thereby.

What I claim and desire to protect by Letters Patent is:

1. A molding powder comprising 10 parts of ethyl cellulose having an ethoxyl content from about 41% to about 51%, and from 1 to 10 parts of hydrogenated rosin.

2. A molding powder comprising 10 parts of ethyl cellulose having an ethoxyl content in the range from about 44% to about 49% and from 1 to 10 parts of hydrogenated rosin.

3. A molding powder comprising 10 parts of ethyl cellulose having an ethoxyl content in the range from about 44% to about 49% and from about 1.0 to about 3.5 parts of hydrogenated rosin.

4. A molding powder comprising 10 parts of ethyl cellulose having an ethoxyl content in the range from about 44% to about 49%, from 1 to 10 parts of hydrogenated rosin, and a molding lubricant.

5. A molding powder comprising 10 parts of ethyl cellulose having an ethoxyl content in the range from about 44% to about 49%, from 1 to 10 parts of hydrogenated rosin, and a non-solvent plasticizer.

6. A molding powder comprising 10 parts of ethyl cellulose having an ethoxyl content in the range from about 44% to about 49%, from 1 to 10 parts of hydrogenated rosin, and a solvent plasticizer.

7. A molding powder comprising 10 parts of ethyl cellulose having an ethoxyl content in the range from about 44% to about 49%, from 1 to 10 parts of hydrogenated rosin, a solvent plasticizer, and a molding lubricant.

8. A molding powder comprising 10 parts of ethyl cellulose having an ethoxyl content in the range from about 44% to about 49%, from about 1.0 to about 3.5 parts of hydrogenated rosin, and a solvent plasticizer in a quantity less than about 10% of the finished molding powder.

9. A molding powder comprising 10 parts of ethyl cellulose having an ethoxyl content in the range from about 44% to about 49%, from about 1.0 to about 3.5 parts of hydrogenated rosin, and triphenyl phosphate in a quantity less than about 10% of the finished molding powder.

10. A molding powder comprising 10 parts of ethyl cellulose having an ethoxyl content in the range from about 44% to about 49%, from about 1.0 to about 3.5 parts of hydrogenated rosin, and mineral oil in a quantity less than about 2.5 parts.

11. A molding powder comprising about 10 parts of ethyl cellulose having an ethoxyl content in the range from about 44% to about 49%, about 2 parts of hydrogenated rosin, and about 1.3 parts of mineral oil.

DAVID R. WIGGAM.